Figure 1:
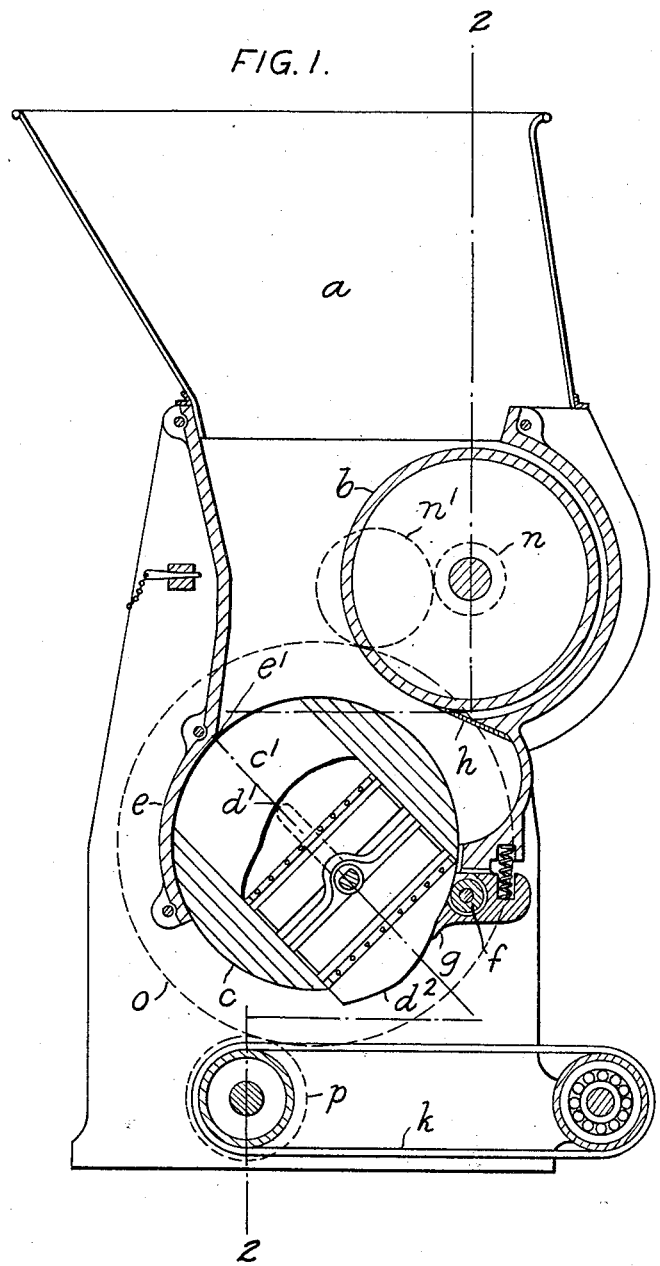

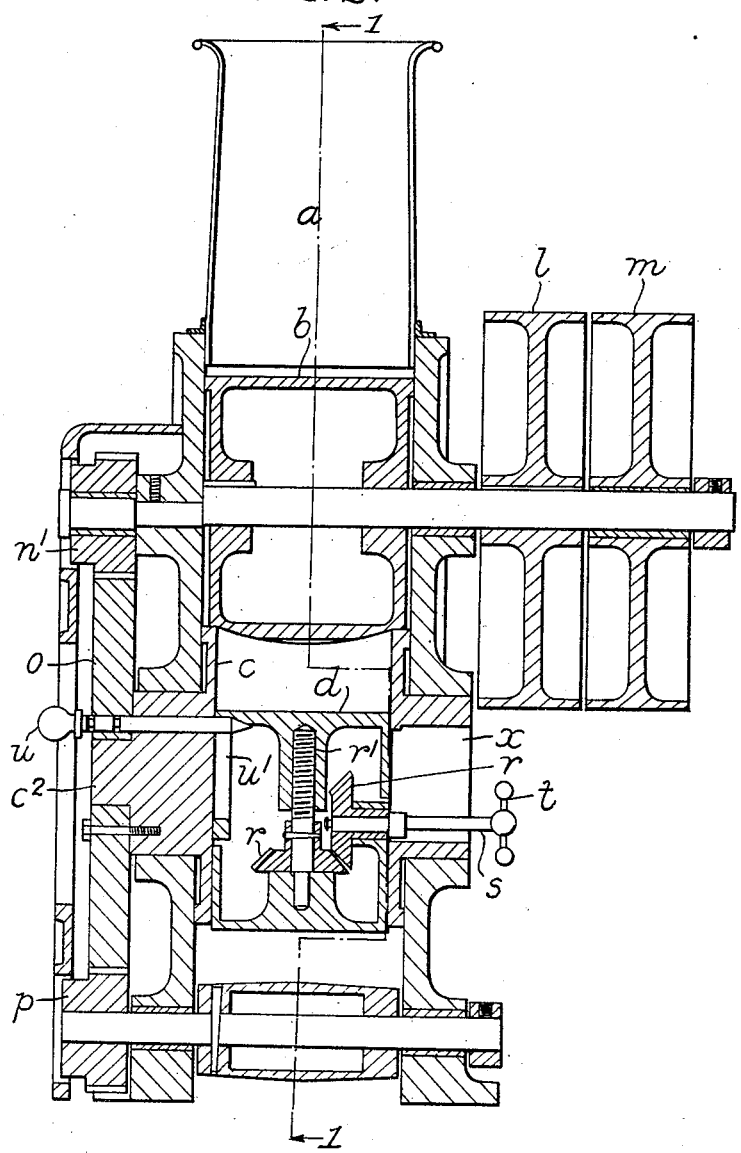

Patented May 10, 1932

1,857,927

UNITED STATES PATENT OFFICE

JACK VIKRUSS MASON, OF CHEADLE HULME, CHESHIRE, ENGLAND

VARIABLE DIVIDING MACHINE FOR DOUGH

Application filed April 12, 1930, Serial No. 443,806, and in Great Britain September 3, 1929.

This invention relates to an improved variable dividing machine for dough in which the salient characteristics are that the size of the piece of dough that is required may be varied, and in a type of machine having a receiving element wherein two pieces of dough may be fed at pre-determined intervals, one of the pieces of dough being caused to act on a member in such a way that in conjunction with the said member the dough acts as a piston or ejector so as to force out its companion piece of dough, all in combination with a feeding device for the dough.

In carrying out my present invention I may employ, for example, a roughened feed roller for the dough which is situated within a dough receptacle, and the said feed roller is adapted to have a rotary motion on a horizontal plane.

Situated in the frame work of the device, and below the said roughened feed roller is a drum which is capable of being rotated.

Within the said drum and at right angles to the axis thereof is a piston in two parts, which piston is capable of being adjusted by means of say bevel or other gearing adapted to turn or partially turn a screwed member between the piston in parts; the said hereinbefore referred to bevel wheels being operated for example by means of a suitable hand wheel outside the frame of the machine.

The rotating drum hereinbefore referred to is preferably given a motion of rotation within its member, by means of sprocket wheels and chain drive, this being preferably effected from the shaft carrying the roughened dough feeding device.

Suitable spring controlled stop and seizure pins may be employed for retaining the various parts of the mechanism in their required positions and a suitable scraping device for removing the dough at the ejection point may be provided and also a further cleaning scraper may be employed for the dough feed roller.

The ends of the piston in two parts hereinbefore referred to are not concentric with the rotating drum, when the said piston is at the outer ends of its stroke, but they are cam shaped, the leading edges of the piston periphery being flush with the drum surface and the following edges of the piston being a pre-determined distance out.

In contact, preferably with the drum, is an idle roller and pivoted about the same at the centre thereof, is a scraper blade pressed on to the said drum by means of a spring.

Referring again to the idle roller, this operates on the piston in its motion of rotation at the piston's protruded part in such a way that the piston is pushed into its pocket and whereby a certain amount of the dough in the pocket at the other end of the piston is ejected and goes back into the bulk of the dough, whereby the correct amount of dough is permitted to remain in the pocket of the piston.

I prefer the roughened dough feed roller and the drum both to revolve continually in the same direction, the drum making say half a revolution and the feed roller making say three revolutions for each piece of dough discharged from the machine.

In construction the machine is so built that the parts can be easily removed for cleaning purposes, which is of importance in machines of this character.

In order that my invention may be fully understood I have appended two sheets of drawings in which Fig. 1 is a sectional view taken substantially along the line 1—1 of Fig. 2. Fig. 2 is a sectional view taken substantially along the line 2—2 of Fig. 1. In Fig. 1 of the drawings the drum is shown partially rotated, the space therein being filled with dough and the piston in the pocket of the said drum is now being operated in such a manner that it is causing any excess of dough to protrude from the pocket, whereby as the drum is further rotated, in a counterclockwise manner looking at Fig. 1, the excess dough is sheared off at a point $e^1$ of the inside of the casing $e$.

Referring to the drawings, $a$ is a receptacle for receiving dough, suitably mounted on the framework of the machine, substantially in the manner as shown. At the lower end of the receptacle $a$ is a feed roller $b$ which may have a roughened or smooth periphery. This roller is for the purpose of feeding the dough, to the required parts. Below the said feed roller $b$ is a drum $c$ containing a pocket $c^1$ having within it a piston $d$ divided in its length substantially as shown, the said piston being provided with the cam shaped faces $d^1$ and $d^2$. This drum $c$ is contained within the framework $e$ of the machine.

Suitably carried by the said framework and adjacent to the cam faced piston $d$ is a roller $f$ and a scraper $g$. Suitably carried within the inside of the framework $e$ is another scraper $h$ and there may be situated below the drum $c$ a conveyor belt $k$.

The feed roller $b$ is given a motion of rotation in the examples illustrated in the drawings, by means of fast and loose pulleys $l$ and $m$ which are mounted on a shaft passing through the machine as shown and on which shaft is mounted the feed roller $b$ and rotated by the said shaft. At that end of the shaft remote from the pulleys $l$ and $m$, in the examples shown, is a spur wheel $n$ (see Fig. 1), adapted to gear with another spur wheel $n^1$ (Fig. 2) which gears in turn with a spur wheel $o$ and is secured to a protrusion $c^2$ of the drum $c$ in such a way that a motion of rotation may be given to the said drum and, further, the said spur wheel $o$ may gear with the spur wheel $p$ suitably mounted on a shaft for the purpose of driving the conveyor $k$. Instead of the fast and loose pulleys and the spur wheel drive, the machine may be driven by means of a motor and a chain drive, or otherwise.

The piston $d$ in the example shown is divided into two portions and is adjustable, the adjusting arrangement consisting of a pair of bevel wheels $r$, an operating shaft $s$ and handle $t$. The uppermost portion of the piston is interiorly screwed to accommodate a screwed spindle $r^1$, whilst the lower portion is not screwed. It is, therefore, obvious that when the handle $t$ is turned and gives a motion of rotation to the spindle $s$, the screwed spindle $r^1$ rotates and causes the upper portion of the piston to be elevated or lowered according to the direction of rotation given to the spindle $s$. The object of this variation of piston being for adjustment in regard to the weight of the loaf desired and also for the purpose of limiting the weight of the dough to that desired. The piston $d$ is prevented from rotating within the cylinder and its movement is confined to rise and fall by means of the guide pin $u$ which is allowed to move in the slot $u^1$ in the piston $d$. Likewise, the spindle $s$ is allowed to move synchronously with the movement of the piston $d$ in the slot $x$ in a protrusion of the drum $c$.

In operation, the dough is placed in the hopper of this machine and a certain amount of the dough is fed by the feed roller to the space in the pocket. The drum is then rotated and any excess of dough is ejected back into the bulk of the dough by the sliding piston in the said pocket. When the drum has rotated sufficiently the dough contained in one end is ejected from the other end of the pocket by the oncoming dough contacting with the piston whilst being forced into the pocket, the ejected piece of dough being received, for example, on to a conveyor and taken as and where desired. It will be seen that as the pocket $c'$ passes the inlet opening of the receptacle, the dough is fed into it by the roller $b$ causing the piston to be moved outwardly so that its face $d^2$ extends beyond the periphery of the drum $c$ so as to be engaged by the roller $f$ which forces the piston towards the pocket $c'$, thus limiting the capacity of the pocket. As the pocket passes the point $e'$, the excess material is sheared off or removed therefrom so that a predetermined quantity of the material is conducted to the outlet of the receptacle and the conveyor $k$.

In Figs. 1 and 2 of the drawings I have shown a drum with one cylinder and a piston therein. As a modification I may employ more than one cylinder in the drum in which pistons operate and these cylinders may be arranged in any convenient manner within the drum, and the pistons and the gear therefor arranged so as to co-operate in the required action.

Although I have herein described and shown a machine which performs the object of the invention, yet details of construction may be departed from, but the salient features herein described will be retained.

I claim:

1. An apparatus of the class described comprising a receptacle having an inlet and an outlet, a material receiving member revoluble in said receptacle and provided with a through opening which forms a pocket for receiving the material, a double-faced piston slidably mounted in said opening, one of the faces of the said piston acting as a bottom for the pocket and the other arranged to be moved outwardly beyond the end of said member when the material is delivered into the pocket, and means engaging the exposed face of the piston for moving the latter inwardly, whereby all excess material is removed from the pocket as the latter passes said inlet.

2. A dough dividing apparatus of the class described comprising a receptacle having an inlet and an outlet, a revoluble member mounted in said receptacle and having a through opening therein, which forms a pocket for receiving the material as it issues from the inlet, a double faced piston movably mounted in said opening and provided with substantially cam shaped exposed faces, a roller mounted in said receptacle adjacent the inlet for feeding the material to the pocket, and means adjacent the outlet adapted to engage with said cam shaped faces to force the piston inwardly whereby any excess of material in the pocket is removed therefrom as the pocket passes the inlet.

3. A dough dividing apparatus of the class described comprising a receptacle having a revoluble member mounted therein, said member provided with a through opening which forms a pocket for receiving the material, a piston movably mounted in said member, a roller positioned in said receptacle and arranged to engage the exposed end of the piston for moving the latter inwardly a predetermined distance whereby any excess of material in the pocket is removed therefrom, and a yieldable scraper adjacent said roller and arranged to engage the cam faces of the piston during the operation of the apparatus.

4. A dough dividing apparatus of the class described comprising a receptacle having an inlet and an outlet, a revoluble member mounted in said receptacle and having a through opening, which forms a pocket for receiving the material as it issues from the inlet, an adjustable piston slidably mounted in said opening and provided with substantially cam shaped faces, one end of said faces arranged to extend beyond said member, means engaging said exposed face for forcing the piston inwardly, whereby any excess material in the pocket is removed therefrom, and a predetermined quantity of the material is delivered by said member to said outlet.

5. An apparatus of the class described comprising a receptacle having an inlet and an outlet, a material receiving member revoluble in said receptacle and provided with a through opening which forms a pocket for receiving the material as it issues from the inlet, a double faced adjustable piston slidably mounted in said opening, the inner face of the piston acting as a bottom for the pocket when the material is delivered thereto and the outer face extending beyond the end of said member, a roller associated with said member for feeding the material to said pocket, means for rotating said member and said roller at different rates of speed in the same direction, a scraper contacting with said roller, means engaging the outer end of said piston during the operation of said apparatus for moving the piston inwardly and towards the pocket whereby excess material is removed from the pocket as it passes the inlet and a predetermined quantity delivered to the outlet.

6. In an apparatus of the class described comprising a receptacle having an inlet and an outlet, a material receiving member revoluble in said receptacle and provided with a through opening which forms a pocket for receiving the material as it issues from the inlet, a double-faced piston slidably mounted in said opening, the inner face of the piston acting as a bottom for the pocket when the material is delivered thereto and the outer face extending beyond the end of said member, a roller associated with said member for feeding the material to said pocket, means for rotating said member and said roller at different rates of speed in the same direction, a scraper contacting with said roller, means engaging the outer face of said piston during the operation of the apparatus for moving the piston inwardly whereby excess material is removed therefrom as the pocket passes the inlet, a movable conveyor for receiving the material as it issues from said pocket and means for preventing rotation of the piston during the operation of the apparatus.

7. In an apparatus of the class described comprising a casing having a curved body portion, a drum revolubly mounted in said casing concentric with said curved body portion and closely positioned adjacent thereto, said drum having an opening extending diametrically therethrough, a member slidably mounted in said opening and coacting therewith for forming a pocket for receiving the material, the outer end of said member extending beyond the periphery of the drum, and means engaging said outer end for forcing said member inwardly into the pocket whereby any excess material delivered to the pocket is removed therefrom as the drum passes the curved portion of said apparatus.

8. In an apparatus of the class described comprising a casing having a curved body portion, a drum revolubly mounted in said casing concentric with said curved body portion and closely position adjacent thereto, said drum having an opening extending diametrically therethrough, a double faced piston mounted in said opening and coacting therewith for forming a pocket for receiving the material, the outer face of said piston extending beyond the periphery of the drum, and means engaging said outer face for forcing said member inwardly into the pocket whereby any excess material delivered to the pocket is removed therefrom as the drum passes the curved portion of said apparatus.

JACK VIKRUSS MASON.